Reissued July 18, 1950

Re. 23,248

UNITED STATES PATENT OFFICE 23,248

PREPARATION OF SUBSTITUTED ALKYLOLTETRAHYDROPYRAN

William F. Gresham and William E. Grigsby, Wilmington, Del., assignors to E. I. du Pont de Nemours & Company, Wilmington, Del., a corporation of Delaware No Drawing. Original No. 2,493,964, dated January 10, 1950, Serial No. 782,030, October 24, 1947. Application for reissue April 20, 1950, Serial No. 157,191

8 Claims. (Cl. 260—338)

Matter enclosed in heavy brackets [ ] appears in the original patent but forms no part of this reissue specification; matter printed in italics indicates the additions made by reissue

This invention relates to a process for preparation of tetrahydropyrans, and more particularly to the preparation of alkylol substituted tetrahydropyrans from an aldehyde and a 1,3-diene.

One object of the invention is to provide a process for the preparation of new compositions of matter. Another object is to provide a process for the preparation of alkylol substituted hydroxy tetrahydropyrans by the interaction of an aldehyde with a 1,3-diene and especially butadiene. Still another object is to provide a process for the preparation of alkylol substituted hydroxy tetrahydropyrans by the reaction of formaldehyde with butadiene. Yet another object is to provide conditions for effecting the reaction while at one and the same time inhibiting the polymerization of the butadiene. Other objects and advantages of the invention will hereinafter appear.

The above and other objects are accomplished by reacting an aldehyde such as formaldehyde with a 1,3-diene such as butadiene in the presence of an acid condensation catalyst and a polymerization inhibitor. These algylol and formal substituted tetrahydropyrans are obtained from formaldehyde and butadiene[s.]:

[(1) 3 - hydroxy - 4 - methyloltetrahydropyran and (2) its formal:

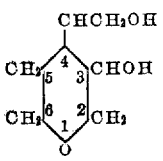

(1)

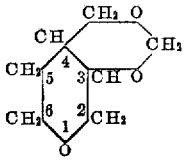

(2)

Due to the presence of two asymmetric carbon atoms (carbon atoms #3 and #4) in each of the above compounds, stereoisomers are possible. In addition these structural isomers appear to be formed.]

[(3)] 4 - hydroxy-3-methyloltetrahydropyran and [(4)] its formal:

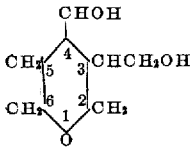

(3)

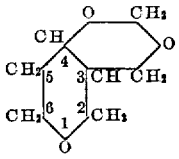

(4)

These compounds also, due to the presence of asymmetric carbon atoms (#3 and #4), may likewise exist in stereoisomeric forms. An intermediate product is likewise obtained, viz. 4-vinyl-1,3-dioxane,

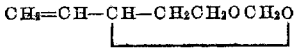

having a boiling point of 142° C. Inasmuch as this intermediate can be reconverted to the desired product, it can be recycled and by this means the desired product produced in the substantial absence of these intermediates.

Examples are given describing the preferred embodiments of the invention in which parts are by weight unless otherwise stated.

Example 1.—A charge of 134.4 grams $H_2O$, 3.8 grams $H_2SO_4$, 0.2 gram hydroquinone, 40.8 grams paraformaldehyde and 24 grams butadiene was processed in a 325 ml. silver-lined shaker tube at 121–135°/4 hrs., during which time the autogenous pressure fell from 250.20 p. s. i. the discharge (200.4 grams, light brown liquid) contained 17.5% of the charged $CH_2O$, of which amount 71% was recovered in the distillate. The discharge was carefully neutralized with NaOH and distilled. The first cut (85–100°, 182.4 grams) contained an upper layer of 6 cc. of intermediate products including 4-vinyl dioxane-1,3. The next cut was the formal of [3-hydroxy-4-methyloltetrahydropyran,] *4 - hydroxy-3-methyloltetrahydropyran,* 18.6 grams. This substance boils at 79°/10 mm. or 56°/2 mm., has a refractive index (as a supercooled liquid) of 1.4668 at 25° C. It is a crystalline, water-soluble solid, melting at 55° (ex ether or cyclohexane). The remainder, 18.6 g., boiled at 98–124° C. at 1 mm. pressure. Redistillation of this fraction gave a pure compound boiling at 120° C./1 mm. This glycol is a viscous, water-soluble, nearly colorless oil with a refractive index of 1.4863 at 25°. The residue was 9.7 g. or 3.7 g. net (allowing for $Na_2SO_4$).

| | [3-Hydroxy 4-methyloltetrahydropyran] | [Formal of 3-Hydroxy 4-methyloltetrahydropyran] | | |
|---|---|---|---|---|
| | *4-Hydroxy 3-methyloltetrahydropyran* | *Formal of 4-Hydroxy 3-methyloltetrahydropyran* | Water Insoluble Layer Considered as Δ-3-Dihydropyran | Total |
| | Per cent | Per cent | Per cent | Per cent |
| Conv. (based on $C_4H_6$) | 31.1 | 29.1 | 16.1 | 76.9 |
| Yield (based on consumed $CH_2O$) | 26.4 | 36.4 | 6.7 | 71.5 |

Example 2.—The aqueous fraction from Example 1, including the upper layer, was recycled with make-up $CH_2O$, $H_2SO_4$, hydroquinone, and butadiene under the same conditions (121–125°/4 hrs./320–59 p. s. i.). Unconverted formaldehyde amounted to 25.6%. The product was analyzed as described in Example 1. The upper layer of the aqueous distillate was 16 cc. (an increase of 10 cc. over the charged amount).

| | [3-Hydroxy 4-methyloltetrahydropyran] | [Formal of 3-Hydroxy 4-methyloltetrahydropyran] | | |
|---|---|---|---|---|
| | *4-Hydroxy 3-methyloltetrahydropyran* | *Formal of 4-Hydroxy 3-methyloltetrahydropyran* | Water Insoluble Layer Considered as Δ-3-Dihydropyran | Total |
| | Per cent | Per cent | Per cent | Per cent |
| Conv. (based on $C_4H_6$) | 23.0 | 36.3 | 26.8 | 86.1 |
| Yield (based on consumed $CH_2O$) | 21.3 | 50.3 | 12.4 | 84.0 |

Example 3.—The aqueous distillate containing 16 cc. of upper layer obtained in Example 2 was processed with make-up formaldehyde (12.7 g.) and 4.4 g. of $H_2SO_4$ in the absence of butadiene at 160–163° C. for 1 hour. Distillation of the product, after neutralization of the $H_2SO_4$ with aqueous caustic, gave 6.8 g. of the formal of [3-hydroxy-4-methyloltetrahydropyran] *4-hydroxy-3-methyloltetrahydropyran* and 14 g. of [3-hydroxy-4-methyloltetrahydropyran] *4-hydroxy-3-methyloltetrahydropyran.*

Example 4.—A reaction mixture comprising 20.0 g. of the formal of [3-hydroxy-4-methyloltetrahydropyran] *4-hydroxy-3-methyloltetrahydropyran,* 275.7 g. of water and 5.0 g. of $H_2SO_4$ was processed at 122–134/C. for 2 hours. Neutralization and distillation of the product gave 3.3 g. of unchanged formal and 11.1 g. of [3-hydroxy-4-methyloltetrahydropyran] *4-hydroxy-3-methyloltetrahydropyran.*

Example 5.—A 37 g. fraction boiling below 115° C./1 mm. and a 20.3 g. fraction boiling higher than what was believed to be [3-hydroxy-4-methyloltetrahydropyran] *4-hydroxy-3-methyloltetrahydropyran* (B. P. ca. 120° C./1 mm.) was boiled at atmospheric pressure with 155.4 g. of water and 10.8 g. of $H_2SO_4$ for 7.5 hours. Neutralization of the $H_2SO_4$ with caustic and distillation gave 20.0 g. of [3-hydroxy-4-methyloltetrahydropyran] *4-hydroxy-3-methyloltetrahydropyran.* (Either isomerization or/and hydrolysis of formals occurred yielding the above compound.)

Example 6.—A mixture comprising 202.5 g. $H_2O$, 8.8 g. conc. HCl, 0.3 g. hydroquinone, 62.1 g. paraformaldehyde, and 27 g. butadiene was processed at 123–130°/3 hrs./410–150 p. s. i. (autogeneous pressure). The product was analyzed as described in Example 1.

| | [3-Hydroxy 4-methyloltetrahydropyran] | [Formal of 3-Hydroxy 4-methyloltetrahydropyran] | | |
|---|---|---|---|---|
| | *4-Hydroxy 3-methyloltetrahydropyran* | *Formal of 4-Hydroxy 3-methyloltetrahydropyran* | Water Insoluble Layer Considered as Δ-3-Dihydropyran | Total |
| | Per cent | Per cent | Per cent | Per cent |
| Conv. (based on $C_4H_6$) | 25.1 | 42.5 | 7.2 | 74.8 |
| Yield (based on consumed $CH_2O$) | 17.3 | 43.8 | 2.5 | 63.6 |

Example 7.—A mixture consisting of 116.6 g. acetic acid, 3.5 g. $H_2SO_4$, 0.2 g. hydroquinone, 24 g. butadiene, 42.0 g. paraformaldehyde, 26.2 g. $H_2O$ was processed at 118–125°/4 hrs. Titration of the discharge showed that 7% of the $CH_2O$ was unconverted. Enough NaOH was added (3 g.) to neutralize the $H_2SO_4$ and the water and acetic acid were removed by distillation. The first cut was 28.1 g. of the solid formal of [3-hydroxy-4-methyloltetrahydropyran] *4-hydroxy-3-methyloltetrahydropyran.* The second cut, 5.3 g., boiled from 61°/1.5 mm. to 96.5°/1.5 mm., while the next fraction, 4.9 g., had a boiling range of 98.5–101°/1.5 mm., and a refractive index (25°) of 1.4618. The final cut, B. P. 107–140°/1.5 mm. weighed 10.5 g. The net residue was 3 g. The formal was produced in 44% conversion (based on $C_4H_6$) and 47.3% yield (based on $CH_4O$ consumed). The higher boiling fractions are esters and are assumed to contain the mono- and diacetates of [3-hydroxy-4-methyloltetrahydropyran] *4-hydroxy-3-methyloltetrahydropyran.*

This example illustrates, inter alia, that when an organic acid such as acetic acid is used as a diluent in place of water, esters are obtained as well as the cyclic formal. Upon analysis the properties of the products were found to be as follows:

Properties

| | Found | Calc. |
|---|---|---|
| [3-Hydroxy-4-methyloltetrahydropyran (or an isomer):] | | |
| *4-Hydroxy-3-methyloltetrahydropyran (or an isomer):* | | |
| Odorless, colorless oil— | | |
| Boiling point | 290–291° C./760 mm.<br>120°/1 mm. | |
| $n_D^{25}$ | 1.4867 | |
| Solubility | ∞ $H_2O$, organic solvents. | |
| Viscosity at 100° F | 515 centistokes | |
| $D_{25}$ | 1.175 | |
| Molecular refraction | 32.33 | 32.40 |
| Percent C | 53.4 (mean) | 54.5 |
| Percent H | 8.9 (mean) | 9.08 |
| Hydroxyl number | 853 (mean) | 850 |
| Adjacent hydroxyl groups, m. eq./2 g | 0.2 | 0 |
| [Formal of 3-hydroxy-4-methyloltetrahydropyran (or an isomer):] | | |
| *Formal of 4-hydroxy-3-methyloltetrahydropyran (or an isomer):* | | |
| Colorless, almost odorless solid— | | |
| Boiling point | 79°/10 mm. | |
| Solubility | ∞ $H_2O$, ethanol methanol, acetone. | |
| Melting point | 55° | |
| Recrystallization solvents | Ether cyclohexane | |
| $n_D^{25}$ (supercooled liquid) | 1.4668 | |
| Molecular weight | 141 | 144 |
| Iodine number | 0 | 0 |
| Hydroxyl number | 0 | 0 |
| 4-Vinyl-1,3-dioxane | | |
| Colorless, mobile liquid | | |
| Odor, ethereal | | |
| Boiling point | 142.5° | |
| $n_D^{25}$ | 1.4413 | |
| Solubility | 5% in $H_2O$/25° Insol. aq. $K_2CO_3$ ∞ organic solvents. | |

Generally speaking, the afore-illustrated reactions may be conducted at temperatures between 100° and 200° C. with an optimum range between 120° and 130° C. A higher temperature tends to give greater tar formation and wider byproduct distribution. The reaction is conducted at these temperatures for processing times ranging from 15 minutes (at 150° C.) to 6 hours (at 120° C.); a four-hour reaction time gave purer [3-hydroxy-4-methyloltetrahydropyran] *4-hydroxy-3-methyloltetrahydropyran.*

The ratio of formaldehyde to butadiene may range from 1 to 6 moles of formaldehyde per mole of butadiene, although the optimum is 3 or more moles formaldehyde per mole of the butadiene. The formaldehyde concentrations should range between 10 and 40% of the total charge with optimum concentrations between 15 and 25%.

Other aldehydes may be used such as acetaldehyde, propanal, the butanals, and the higher straight and branched chain aldehydes. These aldehydes, as well as formaldehyde may be reacted, (in accord with the invention with the proportions and operational procedures used for the formaldehyde-butadiene reaction) with 1,3-dienes other than butadiene such as, 2-methyl, 1,3-butadiene, 2-ethyl 1,3-butadiene and the like.

Any suitable acid condensation catalyst may be employed such, for example, as hydrochloric acid, phosphoric acid, boron trifluoride (either alone or as a complex with water or aldehyde), aromatic sulfonic acids, or other strongly acid condensation catalysts. The catalysts should be employed in concentrations equivalent to the concentration of sulfuric acid when it is used, i. e., concentrations between 0.5 and 8% of the total charge, and optimum ratios from 1.25 to 2% of sulfuric acid.

Any suitable form of formaldehyde may be used such, for example, as 37% aqueous formaldehyde (known commercially as Formalin), paraformaldehyde, or trioxane. Polymerization inhibitors other[s] than hydroquinone may, likewise, be used, examples of which are pyrogallol, catechol, t-butyl catechol, etc.

Because the material boiling higher than the formal of [3-hydroxy-4-methyloltetrahydropyran] *4-hydroxy-3-methyloltetrahydropyran* contains primarily a compound boiling at 120° C./1 mm., and because from theoretical considerations, isomers should be formed, this fraction is considered to be [3-hydroxy-4-methyloltetrahydropyran] *4-hydroxy-3-methyloltetrahydropyran* in the calculation of yield data. These calculations are, it appears, wholly justified since materials boiling lower and higher than 120° C./1 mm. *are converted to 4-hydroxy-3-methyloltetrahydropyran* by processing with aqueous sulfuric acid. (See Example 5.)

The compounds prepared are valuable intermediates for use in the preparation of plasticizers and other compounds.

[The product of the examples of 3-hydroxy-4-methyloltetrahydropyran and/or 4-hydroxy-3-methyloltetrahydropyran and/or stereoisomers thereof and in the claims will be referred to as 3-hydroxy-4-methyloltetrahydropyran.]

We claim:

1. [In a] *A* process for the preparation of alkylol-substituted hydroxytetrahydropyrans, their cyclic formals and 4-vinyl-1,3-dioxane which comprises reacting at least one mol of formaldehyde per mol of butadiene in the presence of a polymerization inhibitor and an acidic condensation catalyst at a temperature between 100 and 200° C. and under autogenous pressure.

2. The process of claim 1 conducted with a ratio of from 1 to 6 moles of formaldehyde per mole of butadiene.

3. The process of claim 1 in which from 10 to 40% of formaldehyde is used based on the total charge.

4. A process for the preparation of [3-hydroxy-4-methyloltetrahydropyran] *4-hydroxy-3-methyloltetrahydropyran* which comprises reacting from one to six mols of formaldehyde per mol of butadiene in the presence of water, a polymerization inhibitor and an acidic condensation catalyst at a temperature between 100° and 200° C., neutralizing the catalyst and recovering the [3-hydroxy-4-methyloltetrahydropyran] *4-hydroxy-3-methyloltetrahydropyran* after distilling off the formal of [3-hydroxy-4-methyloltetrahydropyran] *4-hydroxy-3-methyloltetrahydropyran.*

5. A process for the preparation of the formal of [3-hydroxy-4-methyloltetrahydropyran] *4-hydroxy-3-methyloltetrahydropyran* which comprises reacting from one to six mols of formaldehyde per mol of butadiene in the presence of water, a polymerization inhibitor and an acidic condensation catalyst at a temperature between 100° and 200° C., neutralizing the catalyst and recovering the formal of [3-hydroxy-4-methyloltetrahydropyran] *4-hydroxy-3-methyloltetrahydropyran* by distillation.

6. A process for the preparation of 4-vinyl-1,3-dioxane which comprises reacting from 1 to 6 mols of formaldehyde per mol of butadiene in the presence of a polymerization inhibitor and an acidic condensation catalyst at a temperature between 100° and 200° C., neutralizing the catalyst and separating from a distillation cut between 85° and 100° C. the 4-vinyl-1,3-dioxane.

[7. 4-vinyl-1,3-dioxane.]

[8. An alkylol substituted tetrahydropyran, produced by reacting formaldehyde with butadiene in the presence of water, a polymerization inhibitor and an acidic condensation catalyst at a temperature between 100 and 200° C., boiling at 290–291° C. and 760 mm., having a specific gravity of 1.175 and a refractive index at 25° C. of 1.4867.]

[9. A formal substituted tetrahydropyran, obtained by reacting formaldehyde with butadiene in the presence of water, a polymerization inhibitor and an acidic condensation catalyst at a temperature between 100 and 200° C., having a melting point of 55° C., a boiling point of 79° C. at 10 mm., and a refractive index of 1.4668 at 25° C.]

*10. The product, 4-hydroxy-3-methyloltetrahydropyran, having approximately these properties: boiling at 290–291° C. at 760 mm., having a specific gravity of 1.175 at 25° C. and a refractive index at 25° C. of 1.4867.*

*11. The formal of 4-hydroxy-3-methyloltetrahydropyran, having approximately these properties: a melting point of 55° C., a boiling point of 79° C. at 10 mm., a refractive index (as a supercooled liquid) of 1.4668 at 25° C. and the formula:*

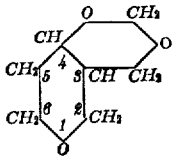

WILLIAM F. GRESHAM.
WILLIAM E. GRIGSBY.

REFERENCES CITED

The following references are of record in the file of this patent or the original patent:

UNITED STATES PATENTS

| Number | Name | Date |
|---|---|---|
| 2,362,307 | Ritter | Nov. 7, 1944 |
| 2,421,862 | Arundale | June 10, 1947 |

Certificate of Correction

Reissue No. 23,248 July 18, 1950

WILLIAM F. GRESHAM ET AL.

It is hereby certified that error appears in the printed specification of the above numbered patent requiring correction as follows:

Column 1, line 24, for "algylol" read alkylol ; column 2, line 31, for "250.20" read 250–20 ; column 3, line 74, for "122–134/C." read 122–134° C. ;

and that the said Letters Patent should be read as corrected above, so that the same may conform to the record of the case in the Patent Office.

Signed and sealed this 17th day of October, A. D. 1950.

[SEAL]

THOMAS F. MURPHY,
*Assistant Commissioner of Patents.*